(12) United States Patent
Shemer et al.

(10) Patent No.: US 12,210,435 B2
(45) Date of Patent: Jan. 28, 2025

(54) AUTOMATED DATA CENTER EXPANSION

(71) Applicant: EMC IP Holding Company LLC, Hopkinton, MA (US)

(72) Inventors: Jehuda Shemer, Kfar Saba (IL); Valerie Lotosh, Ramat-Gan (IL); Erez Sharvit, Ramat-Gan (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 733 days.

(21) Appl. No.: 17/508,553

(22) Filed: Oct. 22, 2021

(65) Prior Publication Data

US 2023/0131954 A1 Apr. 27, 2023

(51) Int. Cl.
*G06F 9/50* (2006.01)
*G06F 11/34* (2006.01)

(52) U.S. Cl.
CPC .......... *G06F 11/3442* (2013.01); *G06F 9/505* (2013.01); *G06F 9/5072* (2013.01); *G06F 9/5077* (2013.01); *G06F 11/3419* (2013.01); *G06F 2209/503* (2013.01); *G06F 2209/508* (2013.01)

(58) Field of Classification Search
CPC .... G06F 11/3442; G06F 9/505; G06F 9/5072; G06F 9/5077; G06F 11/3419; G06F 11/3006; G06F 2209/5019; G06F 11/3409; G06F 2201/81
See application file for complete search history.

(56) References Cited

U.S. PATENT DOCUMENTS

| | | | |
|---|---|---|---|
| 9,983,248 B1* | 5/2018 | Ramirez | H05K 7/1492 |
| 10,250,455 B1 | 4/2019 | Moniz et al. | |
| 11,388,835 B1* | 7/2022 | Bryan | H05K 7/1498 |
| 11,809,910 B2* | 11/2023 | Akkapeddi | G06F 16/219 |
| 2015/0200872 A1 | 7/2015 | Huang et al. | |
| 2016/0085467 A1 | 3/2016 | Saxena et al. | |
| 2018/0246744 A1 | 8/2018 | Li et al. | |
| 2021/0287112 A1* | 9/2021 | Ramasamy | G06N 5/02 |

(Continued)

OTHER PUBLICATIONS

Office Action mailed Jan. 30, 2024 for U.S. Appl. No. 17/508,563, 34 pages.

(Continued)

*Primary Examiner* — Brian W Wathen
(74) *Attorney, Agent, or Firm* — Amin, Turocy & Watson, LLP

(57) ABSTRACT

A system can determine timeseries telemetry data of a first resource utilization of a data center maintained by the system. The system can predict, from the timeseries telemetry data, a second resource utilization of the data center will occur at a future time, the second resource utilization exceeding a threshold amount of resource utilization of the data center. The system can determine, based on an amount of time available until the future time, a selected location indicative of whether to install additional hardware at a first physical location of the data center, or a second physical location of the data center, wherein an amount of time associated with installing the additional hardware at the first physical location is less than an amount of time associated with installing the additional hardware at the second physical location. The system can install the additional hardware at the selected location.

20 Claims, 11 Drawing Sheets

(56) References Cited

U.S. PATENT DOCUMENTS

| | | |
|---|---|---|
| 2022/0147380 A1 | 5/2022 | Azaria et al. |
| 2022/0180275 A1 | 6/2022 | Parizi et al. |
| 2022/0224753 A1* | 7/2022 | Bartram .............. G06F 11/3433 |
| 2022/0374273 A1* | 11/2022 | Eldar ................. G06F 16/2465 |
| 2022/0413931 A1* | 12/2022 | Chiang ................ G06F 9/5044 |
| 2023/0125085 A1 | 4/2023 | Shemer et al. |
| 2023/0132476 A1 | 5/2023 | Shemer et al. |

OTHER PUBLICATIONS

Notice of Allowance mailed Jun. 13, 2024 for U.S. Appl. No. 17/508,563, 24 pages.

* cited by examiner

800

(802)

↓

DETERMINING TIMESERIES TELEMETRY DATA OF A FIRST RESOURCE UTILIZATION OF A DATA CENTER AT A PRESENT TIME 804

↓

PREDICTING, FROM THE TIMESERIES TELEMETRY DATA, A SECOND RESOURCE UTILIZATION OF THE DATA CENTER WILL OCCUR AT A FUTURE TIME, THE SECOND RESOURCE UTILIZATION BEING GREATER THAN THE FIRST RESOURCE UTILIZATION 806

↓

DETERMINING, BASED ON AN AMOUNT OF TIME AVAILABLE UNTIL THE FUTURE TIME, A SELECTED LOCATION INDICATIVE OF WHETHER TO INSTALL ADDITIONAL HARDWARE AT A FIRST PHYSICAL LOCATION OF THE DATA CENTER OR A SECOND PHYSICAL LOCATION OF THE DATA CENTER, AN AMOUNT OF TIME ASSOCIATED WITH INSTALLING THE ADDITIONAL HARDWARE AT THE FIRST PHYSICAL LOCATION BEING LESS THAN AN AMOUNT OF TIME ASSOCIATED WITH INSTALLING THE ADDITIONAL HARDWARE AT THE SECOND PHYSICAL LOCATION 808

AFTER THE INSTALLING OF THE FIRST ADDITIONAL HARDWARE AT THE FIRST PHYSICAL LOCATION, INSTALLING SECOND ADDITIONAL HARDWARE AT THE SECOND PHYSICAL LOCATION 904

↓

AFTER THE INSTALLING OF THE SECOND ADDITIONAL HARDWARE, REMOVING THE FIRST ADDITIONAL HARDWARE FROM THE DATA CENTER 906

AUTOMATED DATA CENTER EXPANSION

BACKGROUND

A data center can comprise a plurality of computers that are configured to store and/or operate on data. Managing a data center can comprise various operations.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine timeseries telemetry data of a first resource utilization of a data center maintained by the system. The system can predict, from the timeseries telemetry data, a second resource utilization of the data center will occur at a future time, the second resource utilization exceeding a threshold amount of resource utilization of the data center. The system can determine, based on an amount of time available until the future time, a selected location indicative of whether to install additional hardware at a first physical location of the data center, or a second physical location of the data center, wherein an amount of time associated with installing the additional hardware at the first physical location is less than an amount of time associated with installing the additional hardware at the second physical location. The system can install the additional hardware at the selected location.

An example method can comprise determining, by a system comprising a processor, timeseries telemetry data of a first resource utilization of a data center. The method can further comprise predicting, by the system and from the timeseries telemetry data, a second resource utilization of the data center will occur at a future time, the second resource utilization exceeding a threshold amount of resource utilization of the data center. The method can further comprise determining, by the system and based on an amount of time available until the future time, a selected location indicative of whether to install additional hardware at a first physical location of the data center, or a second physical location of the data center, an amount of time associated with installing the additional hardware at the first physical location being less than an amount of time associated with installing the additional hardware at the second physical location. The method can further comprise storing an indication to install the additional hardware at the selected location.

An example non-transitory computer-readable medium can comprise instructions that, in response to execution, cause a system comprising a processor to perform operations. These operations can comprise determining timeseries telemetry data of a first resource utilization of a data center at a present time. These operations can further comprise predicting, from the timeseries telemetry data, a second resource utilization of the data center will occur at a future time, the second resource utilization being greater than the first resource utilization. These operations can further comprise determining, based on an amount of time available until the future time, a selected location indicative of whether to install additional hardware at a first physical location of the data center or a second physical location of the data center, an amount of time associated with installing the additional hardware at the first physical location being less than an amount of time associated with installing the additional hardware at the second physical location.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 illustrates another example process flow for automated data center expansion, in accordance with an embodiment of this disclosure;

FIG. 9 illustrates an example process flow for switching a data center expansion from colocated to on premises, and that can facilitate automated data center expansion, in accordance with an embodiment of this disclosure;

DETAILED DESCRIPTION

Example Architectures

Figure 1:
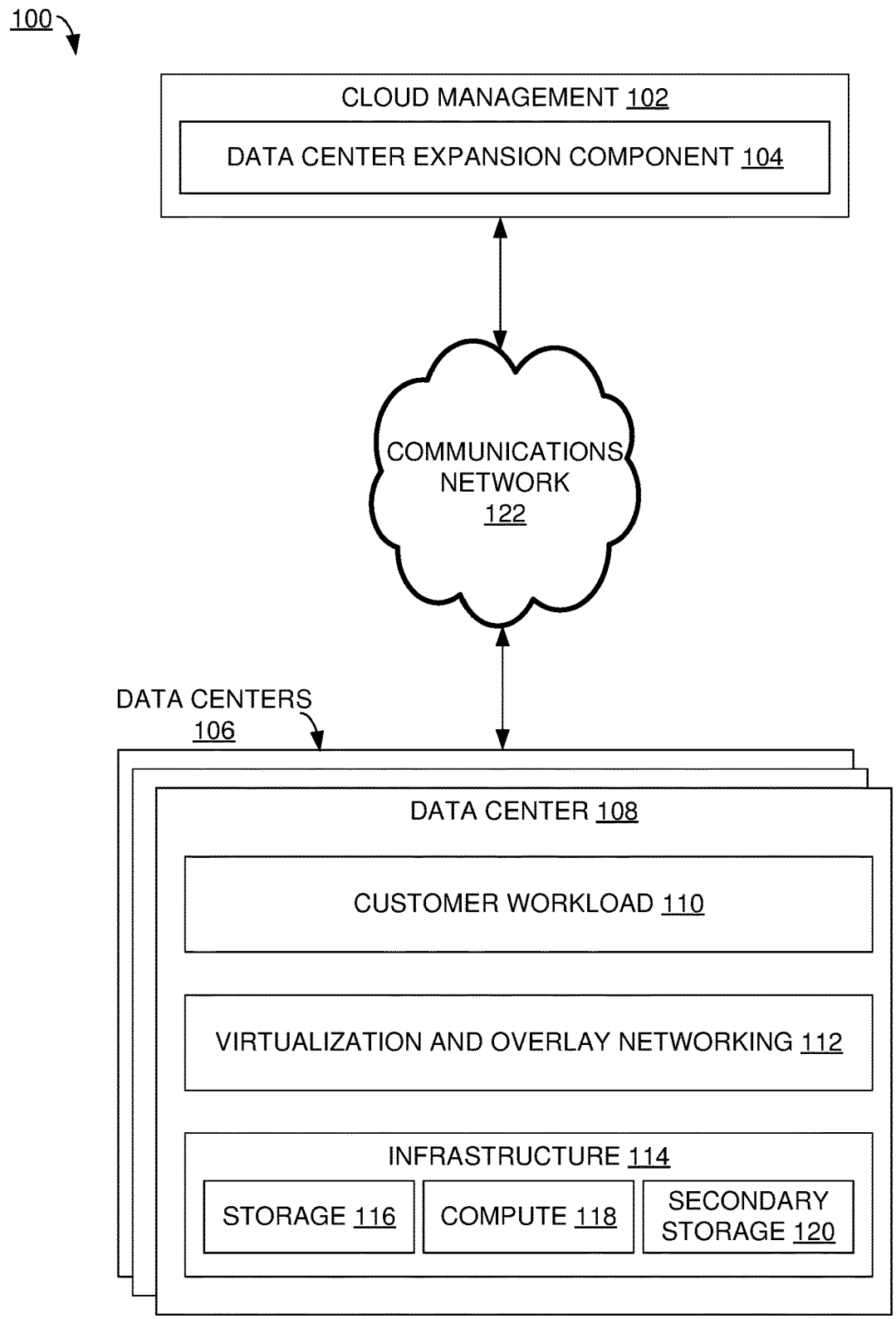
FIG. 1 illustrates an example system architecture that can facilitate automated data center expansion, in accordance with an embodiment of this disclosure.

FIG. 1 illustrates an example system architecture 100 that can facilitate automated data center expansion, in accordance with an embodiment of this disclosure.

System architecture 100 can facilitate deployment and management of infrastructure at customer premise or hosted locations. System architecture 100 can facilitate consuming infrastructure as a service. System architecture 100 generally targets full data center deployments (e.g., data centers 106, in an architecture that can be referred to as data centers as a service (DCaaS)). System architecture 100 can comprise data centers that run virtual infrastructure (e.g., customer workload 110 operating on top of virtualization and overlay networking 112) and can facilitate data protection and mobility use of those data centers.

A data center (e.g., data center 108) in system architecture 100 can comprise compute (e.g., compute 118), storage (e.g., storage 116), and networking, and which has a virtualization layer (e.g., virtualization and overlay networking 112). That is, system architecture 100 can deploy a data center that can run infrastructure as a service (IaaS) workloads. Where system architecture 100 deploys infrastructure as a service, this can be referred to as IaaS as a service (IaaSaaS).

System architecture 100 can differ from other cloud offerings. Some other cloud offerings support creating extensions of themselves, which can be hosted in other locations. In the example of system architecture 100, cloud management 102 can be used to orchestrate and manage a completely independent customer data center (e.g., data center 108). The manner in which technologies are used, and the way that layers (e.g., infrastructure 114 and virtualization and overlay networking 112) can be decomposed in system architecture 100 can differ from that of other cloud offerings.

That is, in other cloud offerings, such as public clouds (where workloads for multiple customers are run on the same hardware and/or in the same data center), hardware resources can generally be shared between tenants (e.g., customers). This can lead to security concerns because one customer can be sharing hardware with a rival entity (e.g., two competing consumer packaged goods companies) or a malicious actor. A security hole or data leak can cause immediate damage. In contrast, with system architecture 100, a small deployment can be created that is dedicated to a customer and data can be stored on customer premises or stored in a dedicated area for the customer.

In other cloud offerings, management can be optimized for a small number of large hardware locations. Other cloud offerings can rely on uniformity and consistency of hardware and access in order to optimize their maintenance. In contrast, system architecture 100 can be used to manage a larger number of customer locations, each with a relatively small deployment. With system architecture 100, there can be differences in hardware between customer locations according to an age and/or version of deployment, or according to a price or service level agreement designation. The management issues associated with these two types of architectures can be different.

Cloud extensions can be additional hardware from a same cloud region located in a different physical place. In system architecture 100, each location can be a separate instance, which can be connected and/or extended by utilizing the present techniques.

System architecture 100 can be utilized to connect to existing customer data center components, whereas with other cloud offerings this can constitute a security violation.

System architecture 100 can be implemented to deploy or utilize hardware of a wide range of profiles and capabilities. This hardware can include one or more servers (e.g., compute 118) with a central processing unit, memory, local storage, and peripheral devices; one or more primary storage systems (e.g., storage 116, where primary storage can generally be optimized for performance (e.g., provide a low latency for reads and writes), and be used for running an organization's main applications and workloads); network switches and devices (e.g., network and/or a storage area network (SAN); and/or additional hardware for secondary storages (e.g., secondary storage 120, where, in contrast to primary storage, secondary storage can generally be optimized for long term reliability and capacity, and used for backup and data protection systems) or other services. This hardware can also include object storage, file systems, network attached storage (NAS), hardware for performance acceleration (e.g., graphics processing units (GPUs), cache cards, central processing unit (CPU) offload cards, smart network interface cards (NICs), etc.), and/or specialized servers or other hardware for specific purposes like stream servers, messaging, artificial intelligence (AI), image processing and/or security.

In some examples, this hardware can be configured and wired by an entity that manages cloud management 102, and on behalf of a customer that possesses data center 108. The hardware can be delivered to data center 108, or can be hosted by the entity that manages cloud management 102, or by a third party. In some examples, in hosting sites, general hardware can already be available at the time of a customer order, and be allocated to a customer upon a service request.

In addition to hardware, multiple software components can be deployed and managed in accordance with customer requests.

Cloud management 102 can comprise a cloud portal that provides a purchasing and management user interface, and that facilitates ordering hardware resources; managing resource usage; monitoring and error handling; and upgrade and life cycle.

Cloud management 102 can store customer-related information and details pertaining to customer infrastructure (e.g., an architecture of data center 108).

In system architecture 100, deployed infrastructure (e.g., deployed infrastructure of data center 108) can be managed by cloud management 102, and in some examples, a customer can be billed according to the resources that the customer utilizes (which can be referred to as, pay as you go). In such examples, the customer can avoid allocating an information technology (IT) team to manage the infrastructure.

In some examples, system architecture 100 involves deploying a full data center (e.g., data center 108), where the data center is entirely managed by cloud management 102, and where the data center is targeted for a virtualized workload.

That is, system architecture 100 can involve a DCaaS where the data center is under cloud management 102 management (e.g., the customer does not provide infrastructure). Virtualized infrastructure (e.g., virtualization and overlay networking 112) can comprise a hypervisor on which the customer allocates virtual workloads (e.g., customer workload 110), which can be an IaaS implementation. That is, a full IaaS data center can be deployed as a service, and referred to as IaaSaaS.

Given those considerations, system architecture 100 can deploy an IaaS data center as a service. System architecture 100 can target a data center that is optimized for virtualized workloads on customer premises or a hosting facility. The customer can provide high-level resource definitions (e.g., intent-based provisioning) and service level agreements (SLAs) for a data center to cloud management 102. From this information, cloud management 102 can derive a data center hardware definition. Hardware corresponding to this hardware definition can be shipped to customer premise, or shipped to or allocated on a hosting site. When the hardware is shipped and ready, cloud management 102 can configure the hardware and networking, and then deploy and configure a virtualization stack on the hardware. In some examples, the hardware can be shipped, wired, deployed, and then configured. In other examples, the hardware can be pre-wired, pre-deployed, pre-configured, and then shipped. For example, one or more racks of hardware can be wired and connected, have a stack deployed on the hardware, and then the racks of hardware can be shipped. Once the racks of hardware are received at a destination, they can be connected to power and an external network and begin operations.

A data center can comprise storage (e.g., storage 116). A data center can also comprise compute (e.g., compute 118), which can comprise servers that lack (or do not utilize) local storage and are configured to boot from and store their data to storage 116. Booting can be implemented via technologies such as a preboot execution environment (PXE) book, or a network boot. The devices that the compute boots from can be configured by cloud management 102 as part of hardware and networking configuration. A data center can also comprise secondary storage (e.g., secondary storage 120). In some examples, there can be multiple instances of each of these components, and multiple different hardware models of each component can be deployed within a data center.

In some examples, local storage can be omitted from compute servers to facilitate maintenance. In such a system architecture, server hardware can be added or replaced and booted from the storage, without maintaining data on the server itself. Additionally, using a common boot device for virtual infrastructure can facilitate easier upgrades and configuration. Then, data protection can be facilitated by using such a system architecture.

Virtualization and overlay networking 112 can comprise the following to support data protection and mobility use cases. Virtualization and overlay networking 112 can comprise virtualized overlay networking (which virtualizes underlying network resources to components that operate on top of the virtual overlay network), and storage that is configured to spoof or virtualize volume identifiers (such as world wide names (WWNs)).

Where cloud management 102 manages the deployment and configuration of a data center, cloud management 102 can have information about the data center and the customer that cloud management 102 can use to manage the data center. This information can include customer infrastructure services information; ordered, deployed, and in-use resources; a customer's physical location; and customer SLAs.

System architecture 100 comprises cloud management 102, data centers 106, and communications network 122.

In turn, cloud management 102 comprises data center expansion component 104. Data centers 106 comprises a plurality of data centers, including data center 108. Data center 108 comprises customer workload 110, virtualization and overlay networking 112, and infrastructure 114. Infrastructure 114 comprises storage 116, compute 118, and secondary storage 120.

Figure 11:
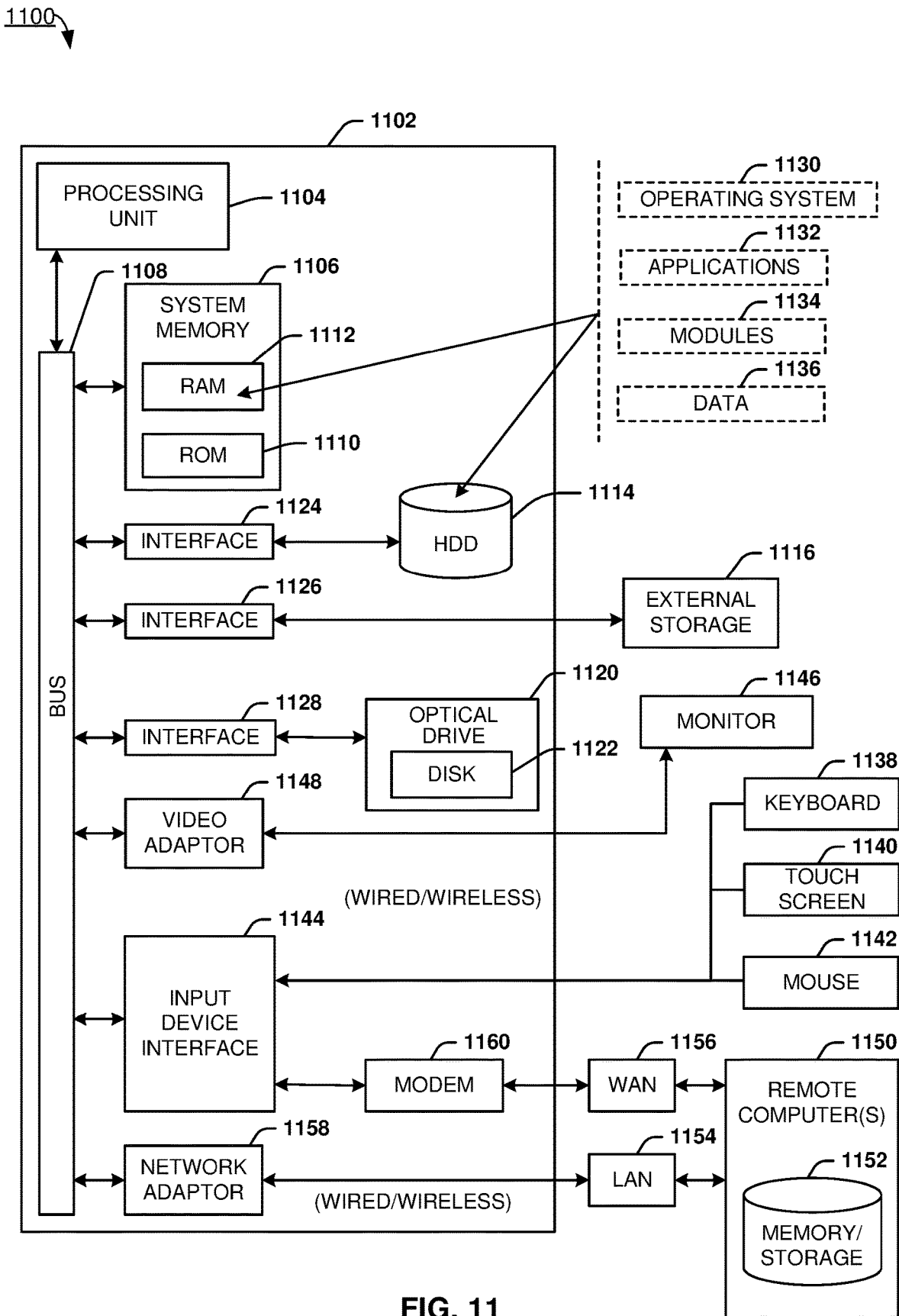
FIG. 11 illustrates an example block diagram of a computer operable to execute an embodiment of this disclosure.

Each of cloud management 102, data centers 106, and data center 108 can be implemented with part(s) of computing environment 1100 of FIG. 11. Communications network 122 can comprise a computer communications network, such as the INTERNET.

Cloud management 102 can communicate with data centers 106 and data center 108 via communications network 122 to manage data centers 106 and data center 108. In managing a data center, cloud management 102 can perform functions such as provisioning and managing virtualization and overlay networking 112, and infrastructure 114, and running customer workload 110 on data center 108.

Data center expansion component 104 of cloud management 102 can manage data centers 106 and data center 108 by automatically expanding those data centers when they need additional computing resources, such as compute or storage resources. In effectuating automated data center expansion, data center expansion component 104 can implement part(s) of the operating procedures of FIGS. 6-10.

Customer workload 110 can comprise workloads provided by a customer of data center 108 that operate on data center 108. Customer workload 110 can comprise a virtualized workload—e.g., a virtual machine on which customer components operate, and where the virtual machine operates on top of virtualization and overlay networking 112.

Virtualization and overlay networking 112 can comprise virtualization management component (e.g., a hypervisor) that supports the execution of customer workload 110. Virtualization and overlay networking 112 can also comprise storage virtualization. In some examples, the virtualization management can comprise management for virtual machine-based virtualization, for container-based virtualization, for other types of virtualization, or for a combination of types of virtualization.

Infrastructure 114 can comprise computer hardware of data center 108. Storage 116 can comprise storage devices upon which computer data can be stored. Compute 118 can comprise one or more servers that process data stored on storage 116. In some examples, compute 118 omits using its own local storage, and instead uses storage 116 for storage. This separation of compute and storage hardware can facilitate managing a data center, as well as restoring a data center. Secondary storage 120 can be similar hardware to storage 116. Where storage 116 is used by compute 118, secondary storage can be used for backup and staging of data, such as to store a snapshot of storage 116, or to store data send from cloud management 102 in the course of managing data center 108.

Figure 2:
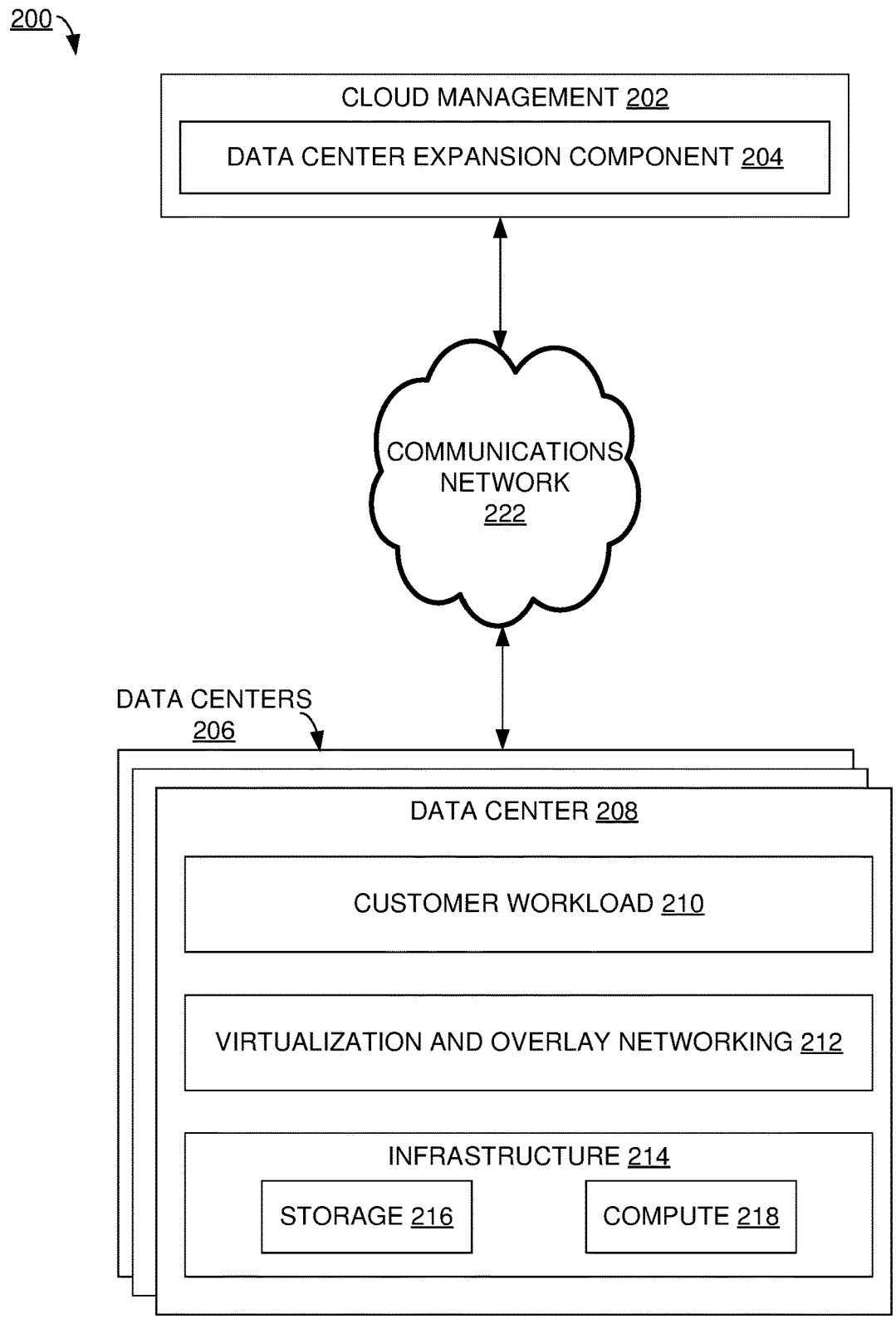
FIG. 2 illustrates another example system architecture that can facilitate automated data center expansion, in accordance with an embodiment of this disclosure.

FIG. 2 illustrates another example system architecture 200 that can facilitate automated data center expansion, in accordance with an embodiment of this disclosure.

System architecture 200 comprises cloud management 202, data centers 206, and communications network 222 (which can be similar to cloud management 102, data centers 106, and communications network 122 of FIG. 1, respectively).

In turn, cloud management 202 comprises data center expansion component 104 (which can be similar to data center expansion component 104). Data centers 206 comprises a plurality of data centers, including data center 208 (which can be similar to data center 108). Data center 208 comprises customer workload 210, virtualization and overlay networking 212, and infrastructure 214 (which can be similar to customer workload 110, virtualization and overlay networking 112, and infrastructure 114, respectively). Infrastructure 214 comprises storage 216 and compute 218 (which can be similar to storage 116 and compute 118, respectively).

A difference between system architecture 200 and system architecture 100 can be that system architecture 200 lacks secondary storage in data center 208 while system architecture 100 has secondary storage 120 in data center 108. Despite this difference, system architecture 200 and system architecture 100 can still each be implemented to facilitate data center restoration.

Figure 3:
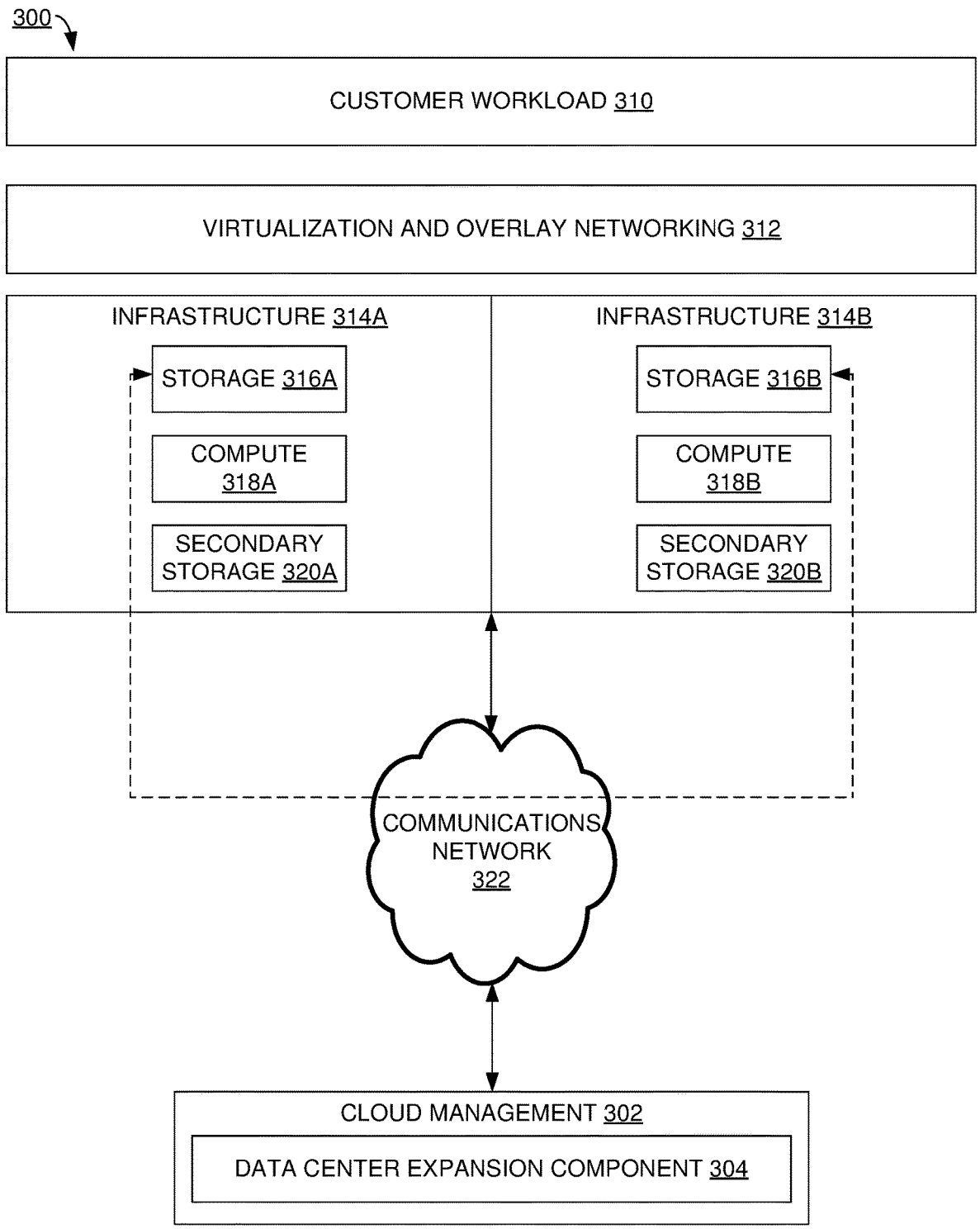
FIG. 3 illustrates another example system architecture that can facilitate automated data center expansion, in accordance with an embodiment of this disclosure.

FIG. 3 illustrates another example system architecture 300 that can facilitate automated data center expansion, in accordance with an embodiment of this disclosure.

System architecture 300 comprises cloud management 302, customer workload 310, virtualization and overlay networking 312, infrastructure 314A, infrastructure 314B, and communications network 322 (which can be similar to cloud management 102, customer workload 110, virtualization and overlay networking 112, infrastructure 114, another instance of infrastructure 114, and communications network 122 of FIG. 1, respectively).

In turn, cloud management 302 comprises data center expansion component 304 (which can be similar to data center expansion component 104). Customer workload 310 and virtualization and overlay networking 312 can be similar to customer workload 110 and virtualization and overlay networking 112, respectively.

Infrastructure 314A comprises storage 316A, compute 318A, and secondary storage 320A (which can be similar to storage 116, compute 118, and secondary storage 120, respectively). Infrastructure 314B comprises storage 316B, compute 318B, and secondary storage 320B (which can be similar to storage 116, compute 118, and secondary storage 120, respectively).

Using storage mirroring (e.g., mirroring of storage 316A and storage 316B), networking technology (such as virtualization and overlay networking 312), and with active compute (e.g., compute 318A and compute 318B), on both locations of a distributed data center (e.g., infrastructure 314A and infrastructure 314B), a distributed data center can automatically be created. Each component data center of a distributed data center can have active compute and workloads, and workloads can be run freely on both locations.

Storage 316A and storage 316B can be configured in a mirroring configuration, where writes written to one storage are immediately and inline mirrored to the other. This configuration can mean that data in storage 316A and storage 316B can be identical (or mirrored). In some examples, technologies such as redundant array of inexpensive disks (RAID) 1, synchronous storage replicas, distributed storage volumes, synchronous clones, and active-active storage volumes can be used to implement mirroring between storage 316A and storage 316B.

While the example of system architecture 300 (and system architecture 400 of FIG. 4) illustrates two data centers in a distributed data center, it can be appreciated that there can be distributed data centers made up of more than two data centers. In some examples, component data centers in a distributed data center (e.g., infrastructure 314A and infrastructure 314B) can be referred to as "data center locations," to distinguish these component data centers from the collected distributed data center.

A distributed data center as in system architecture 300 can be used for data center expansion beyond the physical limits of a data center facility. One data center location can run out of floor space, reach electricity load limits, or air conditioning limits, and so additional expansion is to happen at a different location.

In some examples, the data center locations in a distributed data center are not identical in terms of hardware capabilities, but are managed and exposed to users as one unified data center.

In some examples, cloud management 302 can communicate with virtualization management of virtualization and overlay networking 312 to create affinity between workloads, to designate coupled workloads to run at a same data center location. This approach of affinity between workloads can increase runtime efficiency.

In some examples, a distributed data center architecture can be distinguished from an availability zone architecture. In some examples, an availability zone architecture is active/passive between zones, whereas multiple data center locations of a distributed data center are active concurrently.

In some examples, an availability zone architecture involves nearly-identical data centers (where a passive data center is to handle all workloads being processed by an active data center), whereas data center locations in a distributed data center can be more heterogenous. An availability zone architecture can require identical storage in both locations, whereas it can be that a distributed architecture does not require this. An availability zone architecture can implement a high availability mechanism to orchestrate a failover between data centers for a workload to migrate, and this can be omitted in a distributed data center architecture. In some examples, an availability zone architecture involves separate power and infrastructure to make the availability zones separately available where one fails, and there can be examples of distributed data center architectures where this is neither required nor needed.

Figure 4:
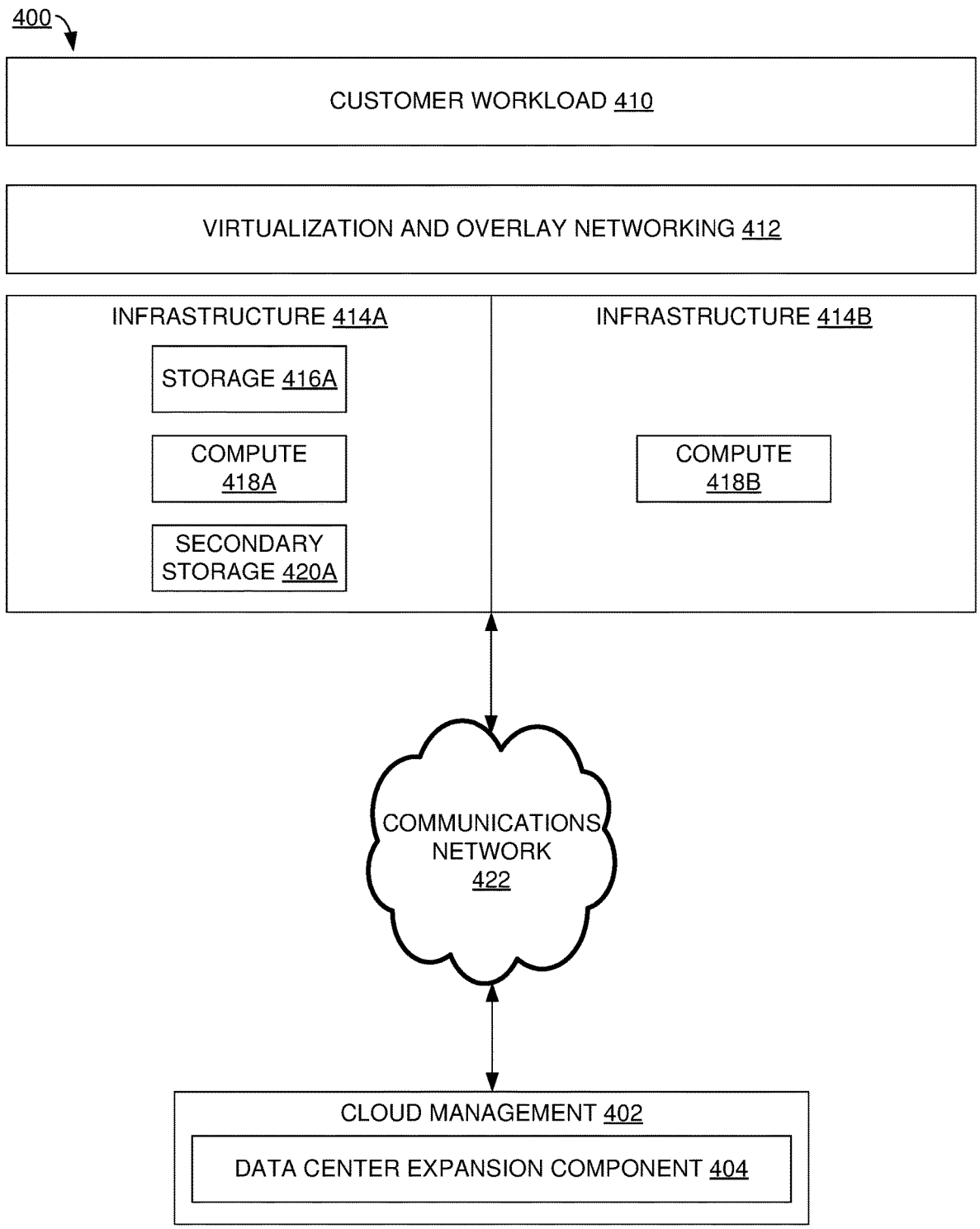
FIG. 4 illustrates another example system architecture that can facilitate automated data center expansion, in accordance with an embodiment of this disclosure.

FIG. 4 illustrates another example system architecture 400 that can facilitate automated data center expansion, in accordance with an embodiment of this disclosure.

System architecture 400 comprises cloud management 402, customer workload 410, virtualization and overlay networking 412, infrastructure 414A, infrastructure 414B, and communications network 422 (which can be similar to cloud management 102, customer workload 110, virtualization and overlay networking 112, infrastructure 114, another instance of infrastructure 114, and communications network 122 of FIG. 1, respectively).

In turn, cloud management 402 comprises data center expansion component 404 (which can be similar to data center expansion component 104). Customer workload 410 and virtualization and overlay networking 412 can be similar to customer workload 110 and virtualization and overlay networking 112, respectively.

Infrastructure 414A comprises storage 416A, compute 418A, and secondary storage 420A (which can be similar to storage 116, compute 118, and secondary storage 120, respectively). Infrastructure 414B comprises compute 418B (which can be similar to compute 118). A difference between system architecture 400 and system architecture 300 of FIG. 3 is that system architecture 400 depicts a distributed storage system where some infrastructure (infrastructure 414B) omits storage. In some examples, a distributed data center can comprise at least two physical data center locations that have other hardware differences, such as differences in compute, secondary storage, object storage, file systems, NASes, hardware for performance acceleration, and specialized servers or hardware for specific purposes.

In such examples, storage 416A can be used for storage for the distributed data center, and both compute 418A of infrastructure 414A and compute 418B of infrastructure 414B can operate on data that is stored in storage 416A.

Figure 5:
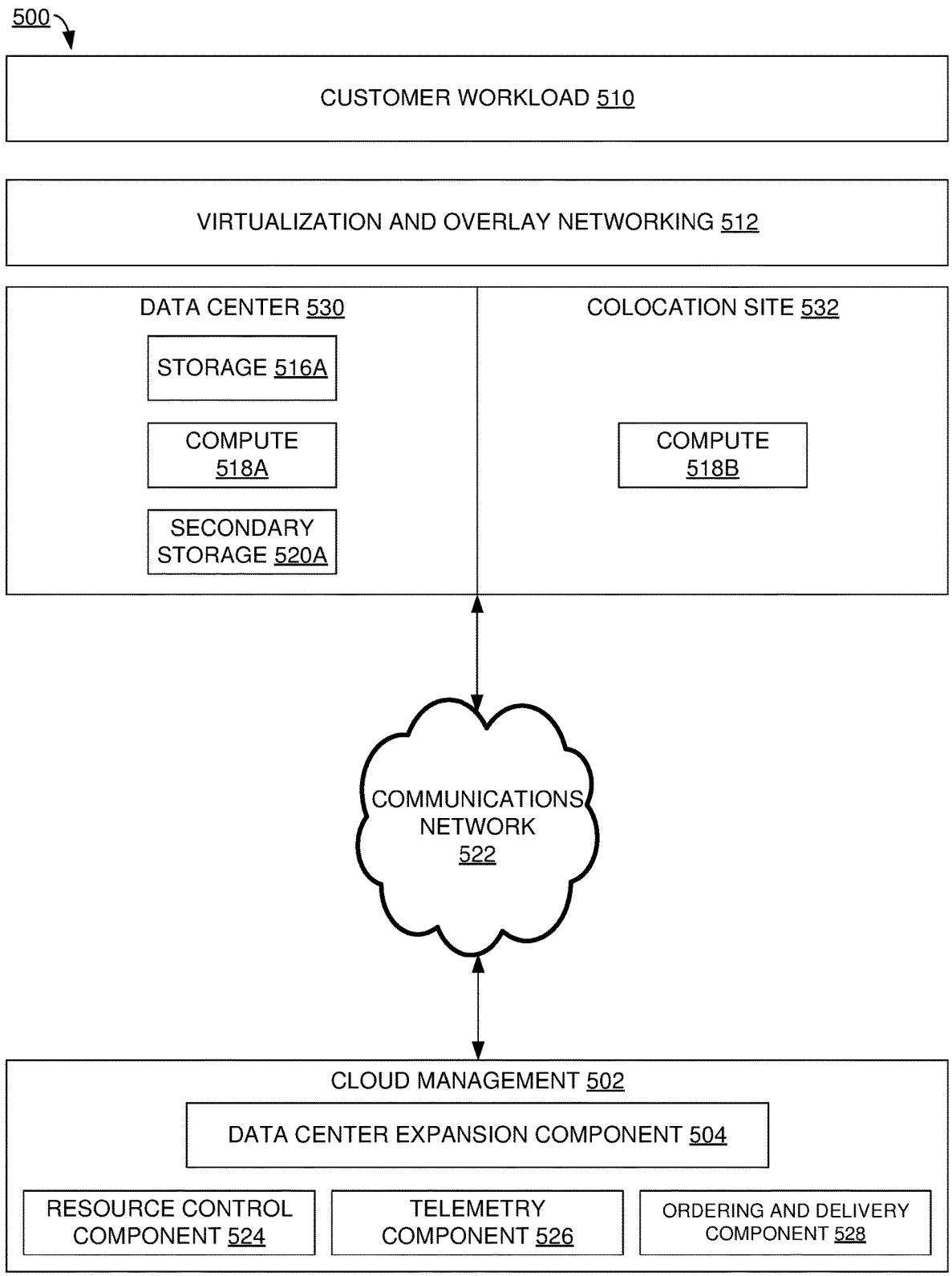
FIG. 5 illustrates another example system architecture that can facilitate automated data center expansion, in accordance with an embodiment of this disclosure.

FIG. 5 illustrates another example system architecture 500 that can facilitate automated data center expansion, in accordance with an embodiment of this disclosure.

System architecture 500 comprises cloud management 502, customer workload 510, virtualization and overlay networking 512, infrastructure 514A, infrastructure 514B, and communications network 522 (which can be similar to cloud management 102, customer workload 110, virtualization and overlay networking 112, infrastructure 114, another instance of infrastructure 114, and communications network 122 of FIG. 1, respectively).

In turn, cloud management 502 comprises data center expansion component 504 (which can be similar to data center expansion component 104). Customer workload 510 and virtualization and overlay networking 512 can be similar to customer workload 110 and virtualization and overlay networking 112, respectively.

Infrastructure 514A comprises storage 516A, compute 518A, and secondary storage 520A (which can be similar to storage 116, compute 118, and secondary storage 120, respectively). Infrastructure 514B comprises compute 518B (which can be similar to compute 118).

As compared with system architecture 400 of FIG. 4, in system architecture 500, cloud management 502 comprises additional components. Cloud management 502 comprises resource control component 524, telemetry component 526, and ordering and delivery component 528.

Resource control component 524 can automatically determine an amount of resources needed by a data center, when they are needed, and where they will be deployed (e.g., at the data center location that is being expanded, at another data center location, or at a colocated location).

Resource control component 524 can accumulate and analyze telemetry information from telemetry component 526, and derive resources from that telemetry information. Telemetry component 526 can collect timeseries telemetry data from a data center.

Timeseries telemetry data can be utilized to understand resource usage and trends. Telemetry data can include an amount of resources, resource usage levels for various resources (e.g., load, throughput, input/output operations per second (IOPS), and latency). From this data, average and peak resource utilization levels can be determined, and workload levels can be determined. Trend analysis can be performed on this average resource utilization level, peak resource utilization level, and workload level data.

Trend derivation can be performed to determine whether data is stationary. Stationary data can generally comprise data that has some local variance, but no significant long-term change. Non-stationary data can generally comprise data that shows growth, decline, or some other modification. A decomposition model can divide data into categories, such as trend (a long-term progression of a series, which can be linear or nonlinear), cyclic (repeated, periodic or nonperiodic variations in data), seasonal (changes attached to dates, seasons, and time (e.g., night or day), where a time and duration can be known), event (events such elections, sporting events, or significant weather events like a hurricane), and random (residual random or irregular noise).

Trend, seasonal, and event data can be determined. Other noise can be removed by using low-pass filters, weights, or other smoothing techniques.

Trend, seasonal, and event data can be determined by approaches such as auto regression integrated moving average (ARIMA) techniques, seasonal ARIMA (SARIMA) techniques, variations of ARIMA techniques, auto-correlation techniques, analysis of variance (ANOVA) techniques, and functional decomposition techniques.

With this data from telemetry component 526, resource control component 524 can have insights into long-term trends, as well as seasonal and temporary occurrences for which resource usage can be predicted.

Telemetry data can provide workload levels and resource utilization levels at fine grained intervals. In some examples, resources for a data center can be designed to contain a level that can handle most peak levels with some to spare. That is, data centers can have some slack (e.g., extra) resources so that small fluctuations and standard peaks are not an issue to process. Slack resources can also provide more time to detect and deliver additional resources to a data center.

Given average workload levels and average resource usage, resource control component 524 can determine or extrapolate a maximal workload level that one element of hardware can handle. An example determination is $$\frac{\text{Workload level on a unit}}{\text{Resource usage percent}} = \frac{X}{100\%},$$

where X is a workload level that will max out the hardware unit. With some spare margin included, this determination can be used to make a direct correlation between expected workload levels and hardware resource amount.

Thus, resource control component 524 can determine an expected amount of resources needed. Trend data (determined from data gathered by telemetry component 526) can provide growth as well as a determination of when resources will be needed, so how much time there is to respond. Where the resource increase is at a level that requires an immediate resource response, then a colocation site can be used to address the additional resources, as there can be hardware that is ready to be put into service for expanding the data center (where the hardware is at a colocation site, that hardware can be used to expand any of several distributed data centers). A response time can affect a determination of whether to deploy additional resources to a colocation site, or on premises. Additionally, or at a later time, hardware can be installed on premises. In some examples, a data center expansion can initially be made at a colocation site, and then switched to on premises after new hardware has been installed on premises.

A colocation site (sometimes referred to as a hosted site) can generally comprise a physical data center location that is separate from a customer's physical data location, that is managed and/or owned by an entity other than the customer, and that is configured to operate workloads for multiple customers. A colocation site can differ from an on-premises data center in that an on-premises data center can be owned and/or controlled by one customer and used to operate that one customer's workloads.

In some examples, a colocation site can have preinstalled hardware that is not associated with a particular customer that is ready for use. As such, the delivery time for such hardware in a colocation site can be immediate or near immediate. Therefore, in some examples, colocations can be better equipped to handle immediate needs. In parallel with serving immediate needs via a colocation site, hardware can be shipped and deployed to an additional location where it takes longer to run workloads on it, the workloads eventually moved to the additional location, and the hardware at the collocation freed and reset for general use again.

Resource control component 524 can connect to ordering and delivery component 528 to place an order and location of hardware. Alerts, anomaly detection, and logging can help determine if something extreme is occurring that is causing the expansion of a data center.

In some examples, the present techniques can be applied to releasing hardware in addition to allocation.

After hardware to expand a data center is deployed, virtual load balancing can be applied to a data center to redistribute a load of the data center based on a current resource state of the data center.

Using these techniques, hardware usage in a data center can be automatically expanded or shrunk. The present techniques can be applied to gather telemetry and performance information, and use that information to derive a resource need prediction. The present techniques can also be applied to determine how much hardware to deliver to a data center, and whether to deploy that hardware on premises or in a colocation site, based on delivery time to on premises.

Figure 6:
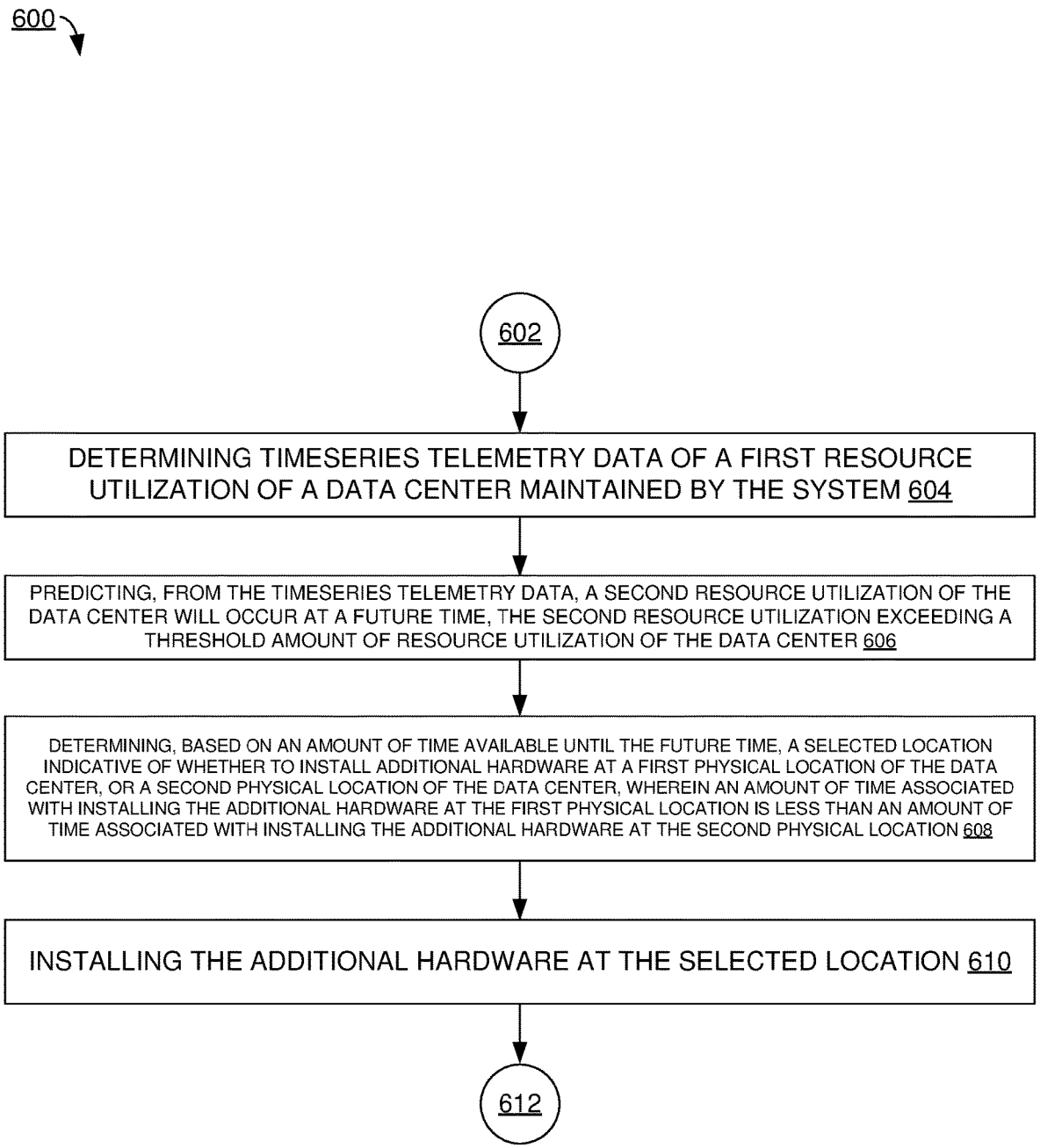
FIG. 6 illustrates an example process flow for automated data center expansion, in accordance with an embodiment of this disclosure.

FIG. 6 illustrates an example process flow 600 for automated data center expansion, in accordance with an embodiment of this disclosure. In some examples, one or more embodiments of process flow 600 can be implemented by data center expansion component 104 of FIG. 1, data center expansion component 204 of FIG. 2, data center expansion component 504 of FIG. 5, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, process flow 900 of FIG. 9, and/or process flow 1000 of FIG. 10.

Process flow 600 begins with 602, and moves to operation 604. Operation 604 depicts determining timeseries telemetry data of a first resource utilization of a data center maintained by the system. That is, telemetry component 526 of FIG. 5 can determine timeseries telemetry data for a data center that comprises data center 530 and colocation site 532.

In some examples, the data center is distributed between the first physical location and the second physical location, and operation 604 comprises maintaining an overlay network that presents first physical network resources of the first physical location and second physical network resources of the second physical location as one group of virtualized network resources to customer workloads that operate on the data center. That is, virtualization and overlay networking 512 of FIG. 5 can be implemented to provide an overlay network to create a distributed data center across data center 530 and colocation site 532.

In some examples the data center is distributed between the first physical location and the second physical location, and operation 604 comprises maintaining storage virtualization that presents first physical storage volumes of the first physical location and second physical storage volumes of the second physical location as a group of virtualized volumes to customer workloads that operate on the data center. That is, virtualization and overlay networking 512 of FIG. 5 can be implemented to provide virtualized volumes to create a distributed data center across data center 530 and colocation site 532.

In some examples, the data center is a first data center, and there is a cloud platform that manages the first data center on behalf of a first customer account, and manages a second data center on behalf of a second customer account. That is, certain operations can be implemented by cloud management 502 of FIG. 5.

In some examples, the cloud platform performs the predicting of the second resource utilization and the determining of the selected location independent of intervention by the first customer account. That is, it can be cloud management 502 that determines where to install new hardware, and makes this determination without involvement of a customer account.

In some examples, the cloud platform performs the determining of the timeseries telemetry data, and operation 604 comprises receiving, by the cloud platform, the timeseries telemetry data from the first data center. That is, telemetry component 526 can receive and monitor timeseries telemetry data from and for data center 530 and colocation site 532.

After operation 604, process flow 600 moves to operation 606.

Operation 606 depicts predicting, from the timeseries telemetry data, a second resource utilization of the data center will occur at a future time, the second resource utilization exceeding a threshold amount of resource utilization of the data center. That is, resource control component 524 of FIG. 5 can utilize timeseries telemetry data from telemetry component 526 to predict that the data center should have its resources expanded, such as by adding additional storage (e.g., storage 516A) or compute (e.g., compute 518A).

After operation 606, process flow 600 moves to operation 608.

Operation 608 depicts determining, based on an amount of time available until the future time, a selected location indicative of whether to install additional hardware at a first physical location of the data center, or a second physical location of the data center, wherein an amount of time associated with installing the additional hardware at the first physical location is less than an amount of time associated with installing the additional hardware at the second physical location.

The first physical location of the data center can be colocation site 532 of FIG. 5, and the second physical location of the data center can be data center 530. It can be faster to install new hardware at colocation site 532 (e.g., the hardware itself can already be installed, and it can be powered on and provisioned for the specific data center) compared to installing new hardware at data center 530 (e.g., hardware for data center 530 can need to be physically shipped to data center 530). In examples where there is not enough time to ship and install hardware at data center 530 before the additional resources are needed, it can be that the hardware is provisioned at colocation site 532.

After operation 608, process flow 600 moves to operation 610.

Operation 610 depicts installing the additional hardware at the selected location. This can comprise installing the hardware at either data center 530 or colocation site 532 depending on how much lead time is predicted (e.g., there can be a preference to install hardware at data center 530, though it can generally be slower to do so compared to installing hardware at colocation site 532).

After operation 610, process flow 600 moves to 612, where process flow 600 ends.

Figure 7:
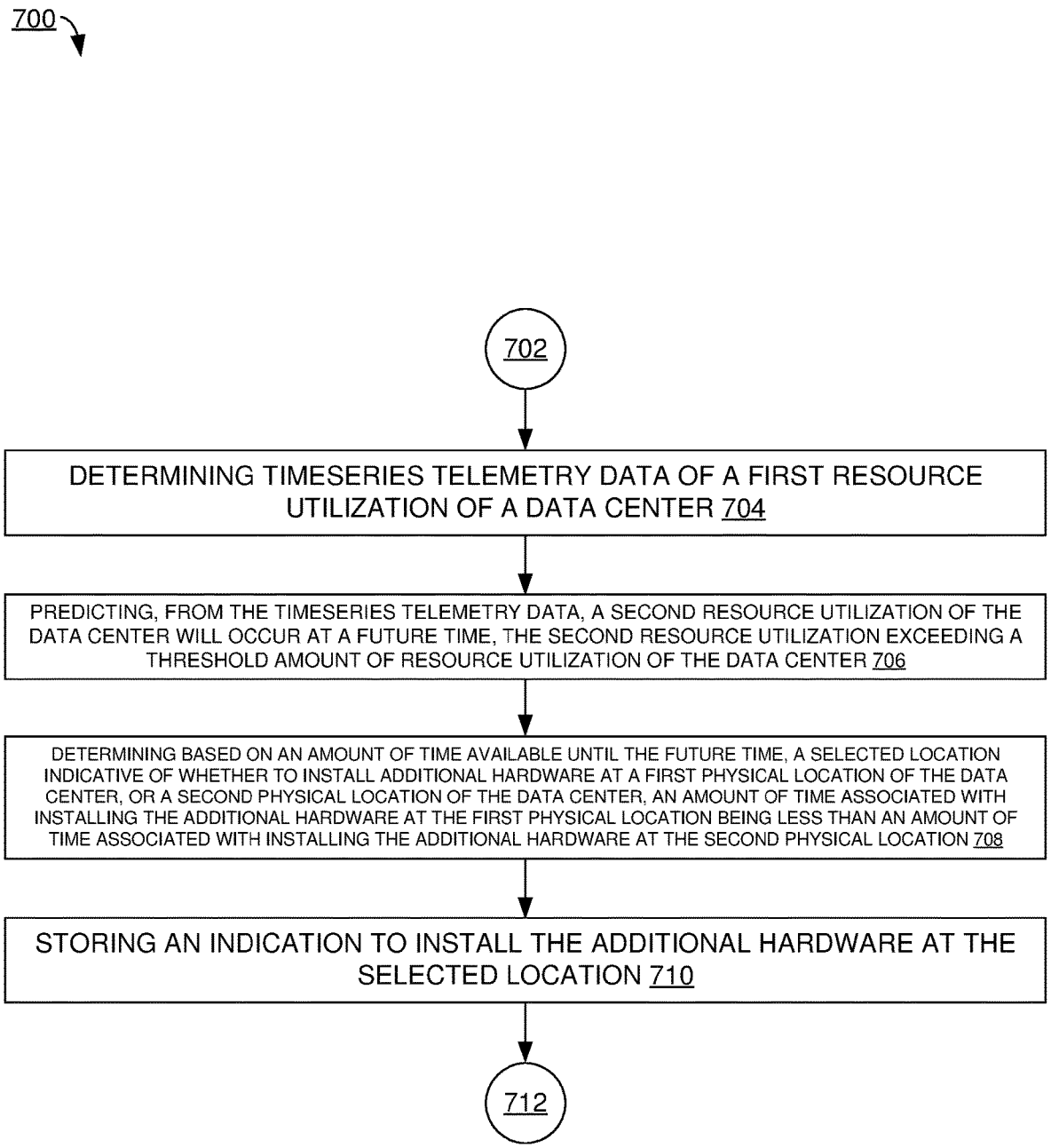
FIG. 7 illustrates another example process flow for automated data center expansion, in accordance with an embodiment of this disclosure.

FIG. 7 illustrates another example process flow 700 for automated data center expansion, in accordance with an embodiment of this disclosure. In some examples, one or more embodiments of process flow 700 can be implemented by data center expansion component 104 of FIG. 1, data center expansion component 204 of FIG. 2, data center expansion component 504 of FIG. 5, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, process flow 900 of FIG. 9, and/or process flow 1000 of FIG. 10.

Process flow 700 begins with 702, and moves to operation 704. Operation 704 depicts determining timeseries telemetry data of a first resource utilization of a data center. In some examples, operation 704 can be implemented in a similar manner as operation 604 of FIG. 6.

In some examples, the timeseries telemetry data comprises an amount of hardware resources of the data center, a load usage level of the data center, a throughput level of the data center, an input or output operation of the data center, or a latency of the data center.

After operation 704, process flow 700 moves to operation 706.

Operation 706 depicts predicting, from the timeseries telemetry data, a second resource utilization of the data center will occur at a future time, the second resource utilization exceeding a threshold amount of resource utilization of the data center. In some examples, operation 706 can be implemented in a similar manner as operation 606 of FIG. 6.

In some examples, operation 706 comprises determining an average resource utilization of from the timeseries telemetry data. In some examples, operation 706 comprises determining a peak resource utilization of the timeseries telemetry data. In some examples, operation 706 comprises determining whether a resource utilization is stationary or non-stationary.

After operation 706, process flow 700 moves to operation 708.

Operation 708 depicts determining, based on an amount of time available until the future time, a selected location indicative of whether to install additional hardware at a first physical location of the data center, or a second physical location of the data center, an amount of time associated with installing the additional hardware at the first physical location being less than an amount of time associated with installing the additional hardware at the second physical location. In some examples, operation 708 can be implemented in a similar manner as operation 608 of FIG. 6.

After operation 708, process flow 700 moves to operation 710.

Operation 710 depicts storing an indication to install the additional hardware at the selected location. In some examples, operation 710 can be implemented in a similar manner as operation 610 of FIG. 6.

After operation 710, process flow 700 moves to 712, where process flow 700 ends.

FIG. 8 illustrates another example process flow 800 for automated data center expansion, in accordance with an embodiment of this disclosure. In some examples, one or more embodiments of process flow 800 can be implemented by data center expansion component 104 of FIG. 1, data center expansion component 204 of FIG. 2, data center expansion component 504 of FIG. 5, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, process flow 900 of FIG. 9, and/or process flow 1000 of FIG. 10.

Process flow 800 begins with 802, and moves to operation 804. Operation 804 depicts determining timeseries telemetry data of a first resource utilization of a data center at a present time. In some examples, operation 804 can be implemented in a similar manner as operation 604 of FIG. 6.

After operation 804, process flow 800 moves to operation 806.

Operation 806 depicts predicting, from the timeseries telemetry data, a second resource utilization of the data center will occur at a future time, the second resource utilization being greater than the first resource utilization. In some examples, operation 806 can be implemented in a similar manner as operation 604 of FIG. 6.

In some examples, operation 806 comprises determining whether the timeseries telemetry data indicates a resource usage trend, a cyclic resource usage, a seasonal resource usage, an event resource usage, or a random resource usage.

In some examples, operation 806 comprises, before the predicting of the second resource utilization, smoothing the timeseries telemetry data. That is, a smoothing technique can be applied to the timeseries telemetry data such as described with respect to FIG. 5.

In some examples operation 806 comprises performing an auto regression integrated moving average (ARIMA), a seasonal ARIMA, an auto correlation technique, an analysis of variance, or a functional decomposition on the timeseries telemetry data. That is, in some examples, various techniques can be applied to predict future resource usage.

After operation 806, process flow 800 moves to operation 808.

Operation 808 depicts determining, based on an amount of time available until the future time, a selected location indicative of whether to install additional hardware at a first physical location of the data center or a second physical location of the data center, an amount of time associated with installing the additional hardware at the first physical location being less than an amount of time associated with installing the additional hardware at the second physical location. In some examples, operation 808 can be implemented in a similar manner as operation 604 of FIG. 6.

In some examples, the data center is associated with a first customer account, the first physical location comprises a colocation center that contains hardware resources for multiple customer accounts, and the second physical location comprises a customer on-premises location that contains hardware resources exclusively for the first customer account. That is, using the example of system architecture 500 of FIG. 5, a distributed data center can comprise data center 530 and colocation site 532.

In some examples the data center comprises an overlay network and virtualized volumes that presents the first physical location and the second physical location as a unified data center on which virtualized customer workloads are able to operate. That is, using the example of system architecture 500 of FIG. 5, a distributed data center can be formed between data center 530 and colocation site 532 using virtualization and overlay networking 512.

After operation 808, process flow 800 moves to 810, where process flow 800 ends.

FIG. 9 illustrates an example process flow 900 for switching a data center expansion from colocated to on premises, and that can facilitate automated data center expansion, in accordance with an embodiment of this disclosure. In some examples, one or more embodiments of process flow 900 can be implemented by data center expansion component 104 of FIG. 1, data center expansion component 204 of FIG. 2, data center expansion component 504 of FIG. 5, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, process flow 800 of FIG. 8, and/or process flow 1000 of FIG. 10.

Process flow 900 begins with 902, and moves to operation 904. Operation 904 depicts, after the installing of first additional hardware at a first physical location, installing second additional hardware at a second physical location. That is, the first physical location can be colocation site 532 of FIG. 5, and the second physical location can be data center 530. Hardware for an expansion can initially be set up at colocation site 532, while hardware is being delivered to data center 530, so that the data center expansion can be implemented more quickly compared to just installing the hardware at data center 530. At a later time, the hardware is delivered to and installed at data center 530.

After operation 904, process flow 900 moves to operation 906.

Operation 906 depicts, after the installing of the second additional hardware, removing the first additional hardware from the first physical location. That is, once sufficient hardware is installed at data center 530 to handle the data center expansion, then the hardware that was being used for expansion at colocation site 532 can be removed (e.g., no longer used for this particular data center, but still installed to be ready for use in another data center expansion).

After operation 906, process flow 900 moves to 908, where process flow 900 ends.

Figure 10:
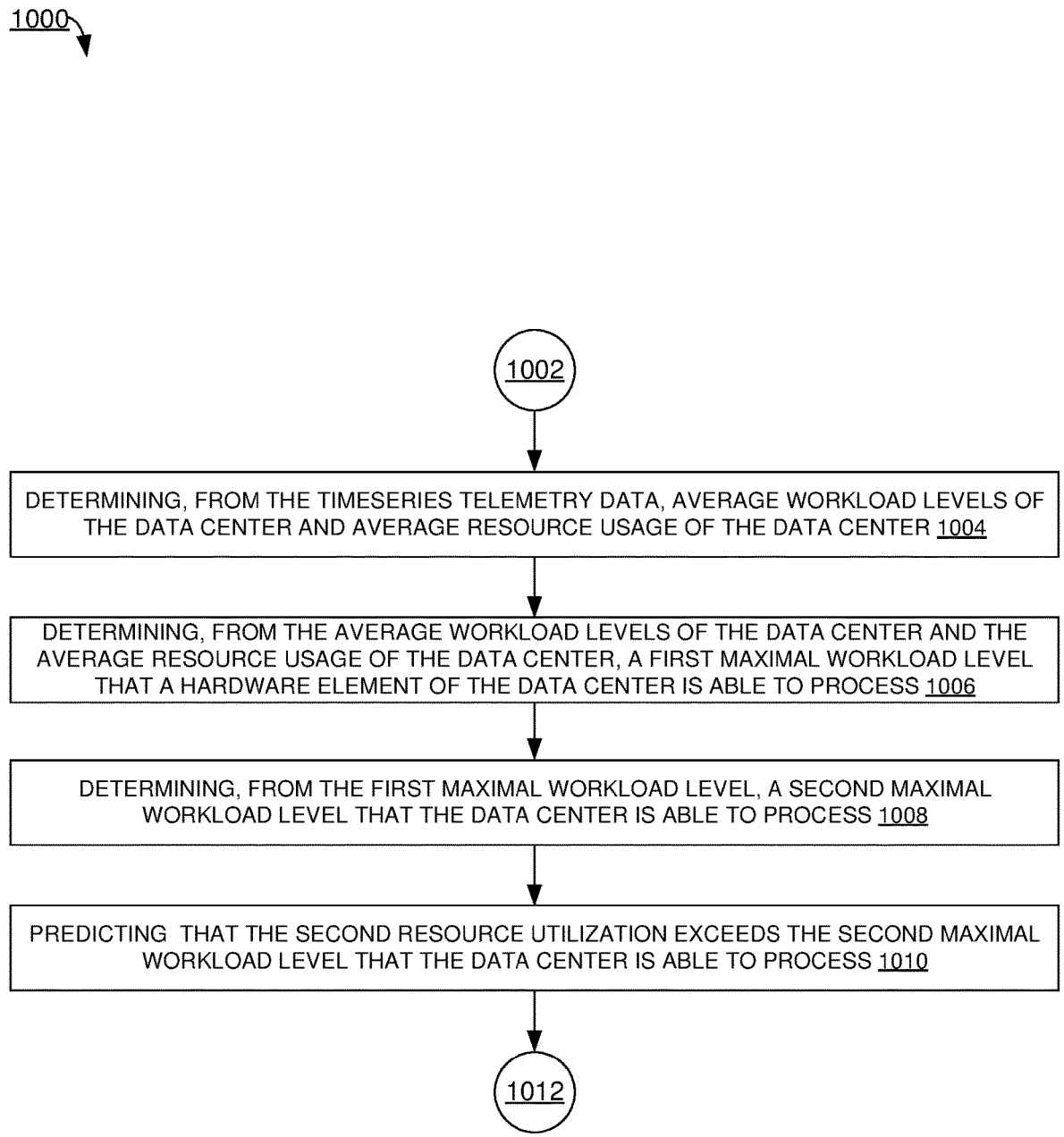
FIG. 10 illustrates an example process flow for determining a workload level that a hardware element can handle, and that can facilitate automated data center expansion, in accordance with an embodiment of this disclosure.

FIG. 10 illustrates an example process flow 1000 for determining a workload level that a hardware element can handle, and that can facilitate automated data center expansion, in accordance with an embodiment of this disclosure. In some examples, one or more embodiments of process flow 1000 can be implemented by data center expansion component 104 of FIG. 1, data center expansion component 204 of FIG. 2, data center expansion component 504 of FIG. 5, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 700 of FIG. 7, process flow 800 of FIG. 8, and/or process flow 900 of FIG. 9.

Process flow 1000 begins with 1002, and moves to operation 1004. Operation 1004 depicts determining, from timeseries telemetry data, average workload levels of a data center and average resource usage of the data center. That is, an average number of workloads executing on the datacenter can be determined, an average amount of resource consumption of those workloads on the data center can be determined.

After operation 1004, process flow 1000 moves to operation 1006.

Operation 1006 depicts determining, from the average workload levels of the data center and the average resource usage of the data center, a first maximal workload level that a hardware element of the data center is able to process.

Take an example where the data center comprises three hardware elements, there are six workloads on average, and the average resource usage is 50%. It can be determined that a hardware element can process a maximal workload level of four workloads.

In some examples, determining the first maximal workload level in operation 1006 can comprise determining a ratio of a workload level on the hardware element to an amount of resource usage of the hardware element.

After operation 1006, process flow 1000 moves to operation 1008.

Operation 1008 depicts determining, from the first maximal workload level, a second maximal workload level that the data center is able to process. Continuing with the example of operation 1006, if the data center has three hardware elements, and each hardware element can process a maximal workload level of four workloads, then it can be determined that the maximal workload level for the data center is 12 workloads.

After operation 1008, process flow 1000 moves to operation 1010.

Operation 1010 comprises predicting that the second resource utilization exceeds the second maximal workload level that the data center is able to process. That is, this prediction in operation 1010 can be similar to the prediction in operation 706 that there will be a future resource utilization that exceeds a threshold amount of resource utilization of the data center. This prediction can be utilized in expanding a data center in anticipation of increased resource utilization needs.

After operation 1010, process flow 1000 moves to 1012, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of cloud management 102, data centers 106, and/or data center 108 of FIG. 1, and/or cloud management 202, data centers 206, and/or data center 208 of FIG. 2.

In some examples, computing environment 1100 can implement one or more embodiments of the process flows of FIGS. 6-10 to facilitate automated data center expansion.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining timeseries telemetry data of a first resource utilization of a data center maintained by the system;
predicting, from the timeseries telemetry data, a second resource utilization of the data center will occur at a future time, the second resource utilization exceeding a threshold amount of resource utilization of the data center;
determining, based on an amount of time available until the future time, a selected location indicative of whether to install additional hardware at a first physical location of the data center, or a second physical location of the data center, wherein an amount of time associated with installing the additional hardware at the first physical location is less than an amount of time associated with installing the additional hardware at the second physical location; and
installing the additional hardware at the selected location.

2. The system of claim 1, wherein the selected location is the first physical location, wherein the additional hardware is first additional hardware, and wherein the operations further comprise:

after the installing of the first additional hardware at the first physical location, installing second additional hardware at the second physical location; and after the installing of the second additional hardware, removing the first additional hardware from the first physical location.

3. The system of claim 1, wherein the data center is a first data center, and wherein the system comprises a cloud platform that is configured to manage multiple data centers for different customers, wherein the cloud platform is configured to manage the first data center on behalf of a first customer account, and wherein the cloud platform is configured to manage a second data center on behalf of a second customer account.

4. The system of claim 3, wherein the cloud platform performs the predicting of the second resource utilization and the determining of the selected location independent of intervention by the first customer account.

5. The system of claim 3, wherein the cloud platform performs the determining of the timeseries telemetry data, and wherein the operations further comprise:

receiving, by the cloud platform, the timeseries telemetry data from the first data center.

6. The system of claim 1, wherein the data center is distributed between the first physical location and the second physical location, and wherein the operations further comprise:

maintaining an overlay network that presents first physical network resources of the first physical location and second physical network resources of the second physical location as one group of virtualized network resources to customer workloads that operate on the data center.

7. The system of claim 1, wherein the data center is distributed between the first physical location and the second physical location, and wherein the maintaining of the data center comprises:

maintaining storage virtualization that presents first physical storage volumes of the first physical location and second physical storage volumes of the second physical location as a group of virtualized volumes to customer workloads that operate on the data center.

8. A method, comprising:

determining, by a system comprising a processor, timeseries telemetry data of a first resource utilization of a data center;

predicting, by the system and from the timeseries telemetry data, a second resource utilization of the data center will occur at a future time, the second resource utilization exceeding a threshold amount of resource utilization of the data center;

determining, by the system and based on an amount of time available until the future time, a selected location indicative of whether to install additional hardware at a first physical location of the data center, or a second physical location of the data center, an amount of time associated with installing the additional hardware at the first physical location being less than an amount of time associated with installing the additional hardware at the second physical location; and storing an indication to install the additional hardware at the selected location.

9. The method of claim 8, further comprising:

determining, by the system and from the timeseries telemetry data, average workload levels of the data center and average resource usage of the data center;

determining, by the system and from the average workload levels of the data center and the average resource usage of the data center, a first maximal workload level that a hardware element of the data center is able to process;

determining, by the system and from the first maximal workload level, a second maximal workload level that the data center is able to process; and wherein performing the predicting of the second resource utilization comprises: predicting, by the system, that the second resource utilization exceeds the second maximal workload level that the data center is able to process.

10. The method of claim 9, wherein performing the determining of the first maximal workload level that the hardware element can process comprises:

determining, by the system, a ratio of a workload level on the hardware element to an amount of resource usage of the hardware element.

11. The method of claim 8, wherein the timeseries telemetry data comprises an amount of hardware resources of the data center, a load usage level of the data center, a throughput level of the data center, an input or output operation of the data center, or a latency of the data center.

12. The method of claim 8, wherein the predicting of the second resource utilization comprises:

determining an average resource utilization of from the timeseries telemetry data.

13. The method of claim 8, wherein the predicting of the second resource utilization comprises:

determining a peak resource utilization of the timeseries telemetry data.

14. The method of claim 8, wherein the predicting of the second resource utilization comprises:

determining whether a resource utilization is stationary or non-stationary.

15. A non-transitory computer-readable medium comprising instructions that, in response to execution, cause a system comprising a processor to perform operations, comprising:

determining timeseries telemetry data of a first resource utilization of a data center at a present time;

predicting, from the timeseries telemetry data, a second resource utilization of the data center will occur at a future time, the second resource utilization being greater than the first resource utilization; and determining, based on an amount of time available until the future time, a selected location indicative of whether to install additional hardware at a first physical location of the data center or a second physical location of the data center, an amount of time associated with installing the additional hardware at the first physical location being less than an amount of time associated with installing the additional hardware at the second physical location.

16. The non-transitory computer-readable medium of claim 15, wherein the predicting of the second resource utilization comprises:

determining whether the timeseries telemetry data indicates a resource usage trend, a cyclic resource usage, a seasonal resource usage, an event resource usage, or a random resource usage.

17. The non-transitory computer-readable medium of claim 15, wherein the operations further comprise:

before the predicting of the second resource utilization, smoothing the timeseries telemetry data.

18. The non-transitory computer-readable medium of claim 15, wherein performing the predicting of the second resource utilization comprises:
  performing an auto regression integrated moving average (ARIMA), a seasonal ARIMA, an auto correlation technique, an analysis of variance, or a functional decomposition on the timeseries telemetry data.

19. The non-transitory computer-readable medium of claim 15, wherein the data center is associated with a first customer account, wherein the first physical location comprises a colocation center that contains hardware resources for multiple customer accounts, and wherein the second physical location comprises a customer on-premises location that contains hardware resources exclusively for the first customer account.

20. The non-transitory computer-readable medium of claim 15, wherein the data center comprises an overlay network and virtualized volumes that presents the first physical location and the second physical location as a unified data center on which virtualized customer workloads are able to operate.

\* \* \* \* \*